April 30, 1957  J. L. JEWETT ET AL  2,790,352
SPIN STABILIZED ROCKET WING LAUNCHER
Filed March 8, 1951  2 Sheets-Sheet 2
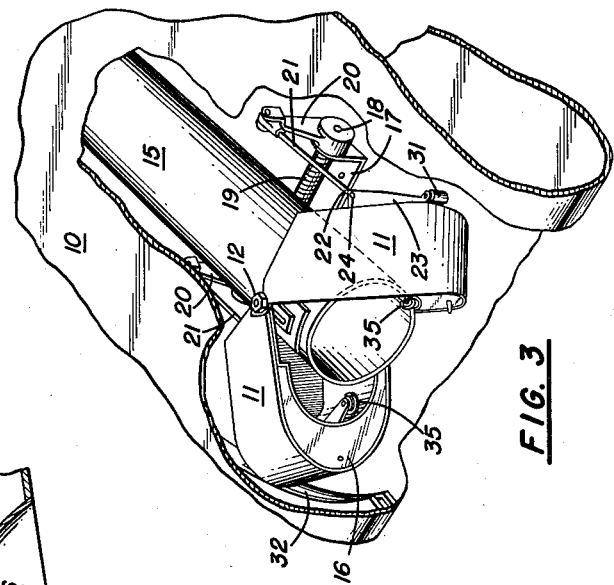
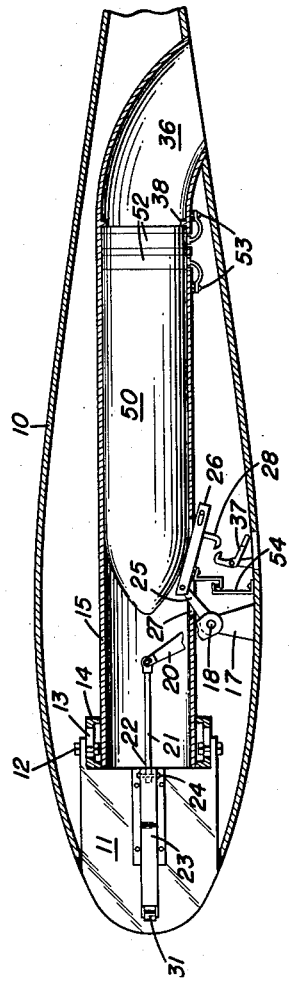
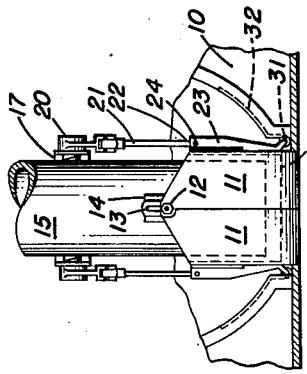
Inventors
JOHN L. JEWETT
CLEM G. TRIMBACH

United States Patent Office 2,790,352
Patented Apr. 30, 1957

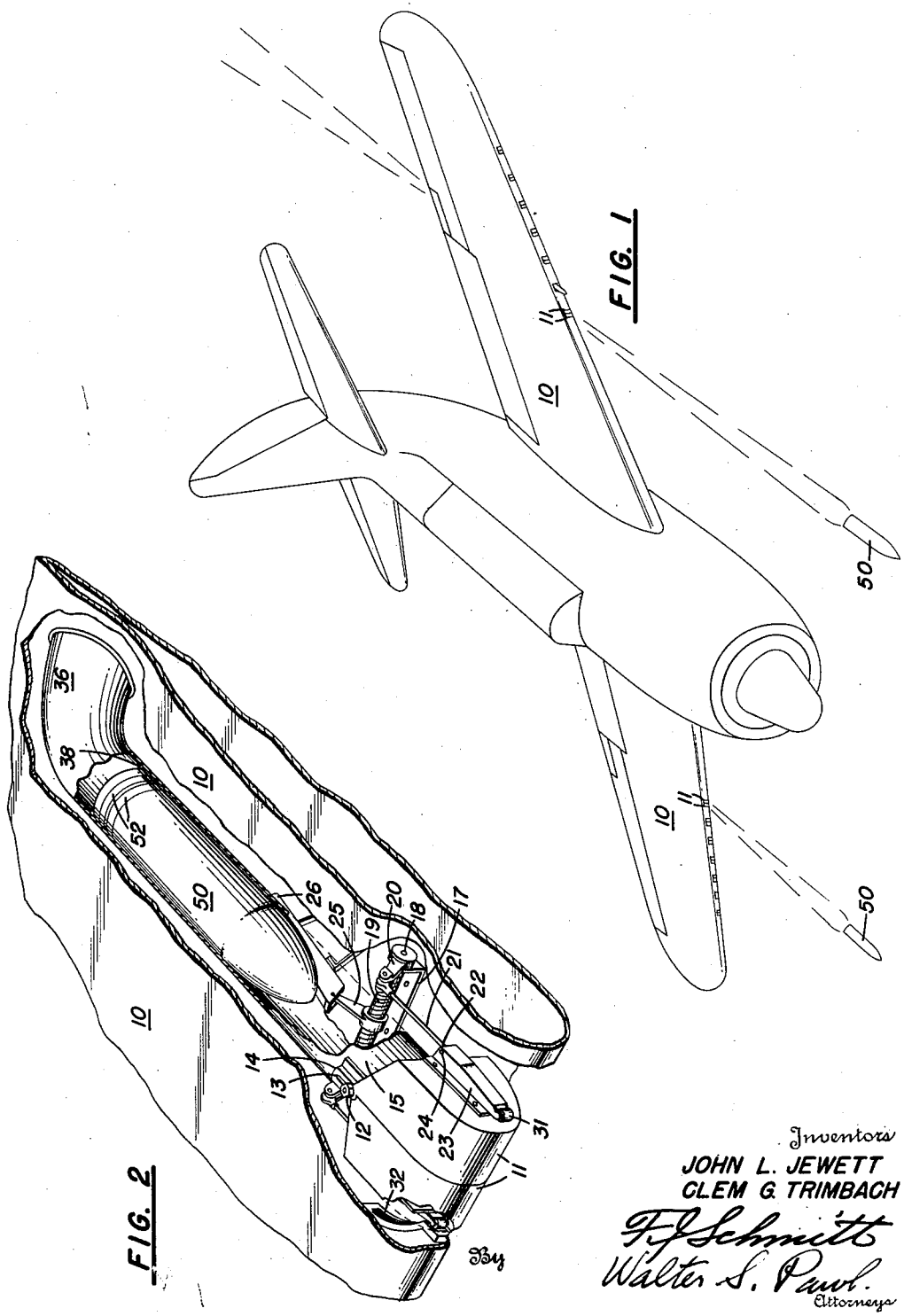

2,790,352

SPIN STABILIZED ROCKET WING LAUNCHER

John L. Jewett and Clem G. Trimbach, Erie County, N. Y., assignors, by mesne assignments, to the United States of America as represented by the Secretary of the Navy Application March 8, 1951, Serial No. 214,528

7 Claims. (Cl. 89—1.7)

The present invention relates generally to rocket launchers and specifically to a rocket launcher incorporated in the leading edge of a wing of an aircraft.

With the increased speeds of military aircraft now in use and in development, apparatus for retaining and releasing rocket projectiles when positioned on the wing or in the air stream increases the air drag and set up areas where shock waves may form due to the compressibility of the air. Self propelled rockets and projectiles are successfully carried and launched from tubes secured to wing surfaces, with the disadvantages of added drag, as stated, and the present invention is intended to eliminate the disadvantages of drag by positioning the rocket tube within the wing structure.

Therefore, an object of the present invention is to provide a rocket launcher for an aircraft having no proturberances exterior to the wing surface.

A further object is to provide a rocket launcher in the form of a unitary device which may be readily installed, removed, or serviced, and which may be used singly or in multiple units.

A further object is to provide a rocket launcher having doors opening sidewardly in the leading edge of the wing which in closed position resembles in conformation and aerodynamic characteristics the adjacent air foil surface.

A further object is to provide a rocket launcher having doors that are actuated by movement forward of the rocket as it is launched.

The exact nature of this invention as well as other objects and advantages thereof will be readily apparent from consideration of the following specification relating to the annexed drawing in which:

Fig. 1 is an isometric view of an aircraft showing the location of the rocket launchers in the wing.

Fig. 2 is a view partly in section of the invention with a rocket in place in the tube.

Fig. 3 is a view partly in section with the doors open for the emission of the rocket.

Fig. 4 is a detail view partly in section of the door latch and cam latch.

Fig. 5 is a vertical view partly in section of the forward end of the tube and doors.

Referring to the drawings, in which like characters indicate like parts through the several views, in Figs. 1 to 5 an aircraft wing 10 is shown having a pair of clam shell shaped doors 11 pivoted to open away from each other on pins 12 slidable in slots 13 in brackets 14 welded or otherwise fixed to the launcher tube 15.

Doors 11 are shaped exteriorly to conform to the leading edge of the wing and have reinforcing members 16 to provide strength. Secured to the wing structure is a second bracket 17, U-shaped, supporting the rotatable shaft 18 normally biased counterclockwise by spring 19. At each end of shaft 18 are door actuating arms 20 and pivotally secured to the arms 20 are links 21 which extend forwardly and have their ends 22 pivotally fixed to the cam housing 23 by pins 24.

On the center of the shaft 18 between the arms of the bracket 17, actuating arm 25 is secured and is pivotally fixed to the door operating cam 26 which extends for part of its length through slot 27 in the launcher tube 15. Latch 28, on cam 26, coacts with hook 37 to hold open the doors 11 and to hold cam 26 depressed to permit loading and arming of the tube 15.

Doors 11 have on their outer sides at the forward end of cam housings 23 the cam rollers 31 which are engageable with cam tracks 32 secured to the wing structure. Inside the doors 11 at the edges thereof are rollers 35 which hold the doors open by contact with the sides of the rocket after it has passed over the door operating cam 26. The blast tube 36 extends out the lower surface of the wing and forms a supporting connection for the aft end of the rocket tube 15. Tube 15 has a stop 38 near its aft end to prevent the rearward movement of the rocket 50, and contact rings 52 on the rocket are engageable with the spring-pressed contact 53 for conduction of the ignition current.

As the invention is contemplated for use with spin stabilized rockets, to which rotation is imparted by conformation of the fins or by other spin engendering means in the rocket, the particular construction of the door operating cam, doors, linkages, and rollers is of utmost importance. Lightweight materials are used throughout, with plastic rollers, ball bearing pivots and the like, in order that the inertia of the doors and latch be kept at a minimum consistent with the strength required to resist the air loads at the leading edge of the wing. Spring 19 is so loaded as to present resistance to the forward movement of the rocket over the door actuating cam 26 until approximately 100 lbs. of thrust has been developed. This enables the rocket to attain the desired initial rotational speed.

As is readily understood from the description and drawings, the operation of the doors is automatic by the forward movement of the rocket depressing cam 26 which turns shaft 18, moving links 21 and doors 11 for the length of slot 13, then cam rollers 31 in cam track 32 guide the doors while they are opening. Spring 19 closes the doors after emission of the rocket. Switch 54 is associated with the cam 26 as a safety feature of the invention, and is incorporated in the firing circuit which includes contact bands 52 on the rocket body and spring contacts 53 secured to the tube 15. Accidental firing of the rocket is prevented during loading or inspection by the automatic opening of switch 54, shown more or less schematically in Fig. 4.

As each rocket launcher is a unitary device, replacement of a unit is accomplished with a minimum of effort and the launcher may be fired singly or in salvo operation by varying the electrical arming and firing controls.

It should be understood, of course, that the foregoing disclosure relates to only a preferred embodiment of the invention and that numerous modifications or alterations may be made therein without departing from the spirit and the scope of the invention as set forth in the appended claims.

We claim:

1. In combination with an aircraft wing, a wing rocket launcher comprising a rocket tube mounted in the wing, a pair of separable doors mounted on the end of said tube faired into the leading edge of the wing and presenting a similar conformation, lever means operable to move said doors rearwardly a short distance out of leading edge faired position and then apart from each other, means including rollers on the doors and tracks in the wing for guiding said doors between open and forward positions, and means operatively connected to the lever means for actuating the same in response to movement of a rocket fired in said tube, said means resisting movement of the rocket until a predetermined quantity of thrust is attained.

2. The device as set forth in claim 1 in which the doors are mounted on the tube by means of pins received in elongated slots permitting rearward movement of said doors.

3. The device as set forth in claim 1 in which said last named means comprises a cam depressible by forward movement of a rocket in said tube and a spring-biased shaft connecting said lever means to said cam.

4. In the device as set forth in claim 1, roller means on the inside of said doors operable to ride on the sides on an emerging rocket and thereby hold said doors in open position until the rocket has been emitted.

5. A closure for the forward end of an inboard mounted rocket tube in an aircraft wing comprising a pair of doors of substantially U-shape having vertical meeting edges in line with and ahead of the centerline of the tube, said doors each having internal braces and an exterior configuration when closed identical with and coplanar with the leading edge of the wing, said doors further having their rear corners adjacent the meeting edges pivotally mounted on a set of pins longitudinally and limitedly movable in a pair of slotted brackets on said tube, rollers on the outer edges of said doors constructed and arranged to coact with tracks in said wing on either side of said tube to support said doors and guide them between open and closed positions, spring-biased linkage means adapted to move said doors rearwardly the distance of movement of said pins in said slotted brackets and thence outwardly from said tube, actuating means for said linkage means including a cam arranged to be depressed by a rocket moving forwardly in said tube, and rollers on said doors adapted to ride on the sides of an emerging rocket to hold said doors in open position while the rocket emerges.

6. In an aircraft wing having a leading edge in which there is an aperture, a rocket launcher comprising an open ended tube having its forward end located behind said aperture and in alignment therewith and fixedly mounted relative to said wing, a pair of doors at the forward end of said tube which when closed are disposed in said aperture and present a configuration flush with and similar to that of the wing leading edge, means pivotally and slidably securing said doors directly to said tube for both axial and swinging movement relative thereto so that said doors may be withdrawn from said aperture and then swung open to expose said tube, means to guide said doors during both of said movements, means associated with said tube responsive to rocket motion through said tube, and resiliently biased means operatively connected with said doors and said last mentioned means for actuating said doors through both of said movements upon movement of said rocket toward said doors.

7. In an aircraft wing having a leading edge in which there is an aperture, a rocket launcher comprising an open ended tube having its forward end located behind said aperture and in alinement therewith and fixedly mounted relative to said wing, a pair of doors at the forward end of said tube which when closed are disposed in said aperture and present a configuration flush with and similar to that of the wing leading edge, means pivotally and slidably securing said doors directly to said tube for both axial and swinging movement relative thereto so that said doors may be withdrawn from said aperture and then swung open to expose said tube, means to guide said doors during both of said movements, yieldable means in said tube ahead of the normal position of the rocket and engageable by the rocket upon rocket movement through said tube, and resiliently biased means operatively connected with said doors and said last mentioned means for actuating said doors through both of said movements upon movement of said rocket toward said doors.

References Cited in the file of this patent

UNITED STATES PATENTS

| | | |
|---|---|---|
| 1,271,640 | Wentling | July 9, 1918 |
| 2,438,924 | Kramer et al. | Apr. 6, 1948 |
| 2,445,235 | Myers | July 13, 1948 |
| 2,465,402 | Skinner et al. | Mar. 29, 1949 |
| 2,485,715 | Eastman | Oct. 25, 1949 |
| 2,517,333 | Motley | Aug. 1, 1950 |

FOREIGN PATENTS

| | | |
|---|---|---|
| 147,406 | Germany | Jan. 18, 1904 |
| 171,502 | Germany | June 5, 1906 |
| 804,838 | France | Nov. 3, 1936 |
| 863,443 | France | Apr. 1, 1941 |
| 587,842 | Great Britain | May 7, 1942 |
| 914,341 | France | Oct. 4, 1946 |
| 589,177 | Great Britain | June 13, 1947 |
| 974,688 | France | Oct. 4, 1950 |